(12) United States Patent
Carnicle et al.

(10) Patent No.: US 9,121,437 B1
(45) Date of Patent: Sep. 1, 2015

(54) RESILIENT S-HOOK SHAPED CONSTRUCTION SITE TOOL

(71) Applicants: Michel A. Carnicle, Aurora, CO (US); Justin Tourdot, Denver, CO (US)

(72) Inventors: Michel A. Carnicle, Aurora, CO (US); Justin Tourdot, Denver, CO (US)

(*) Notice: Subject to any disclaimer, the term of this patent is extended or adjusted under 35 U.S.C. 154(b) by 0 days.

(21) Appl. No.: 14/051,367

(22) Filed: Oct. 10, 2013

Related U.S. Application Data

(60) Provisional application No. 61/712,413, filed on Oct. 11, 2012.

(51) Int. Cl.
*F16B 45/00* (2006.01)
*F16B 45/02* (2006.01)

(52) U.S. Cl.
CPC ....................................... *F16B 45/02* (2013.01)

(58) Field of Classification Search
CPC ......... F16L 3/1058; F16L 3/00; F16L 3/1075; F16B 45/02
See application file for complete search history.

(56) References Cited

U.S. PATENT DOCUMENTS

| | | | | |
|---|---|---|---|---|
| 1,165,606 A * | 12/1915 | King | .............................. | 24/599.9 |
| 6,367,118 B1 * | 4/2002 | Berfield | ........................... | 15/323 |
| D482,269 S * | 11/2003 | Martello | ......................... | D8/395 |
| 7,429,020 B2 * | 9/2008 | Huebner et al. | ................ | 248/58 |
| 7,516,930 B2 * | 4/2009 | Chen | ............................ | 248/304 |
| 7,882,600 B2 * | 2/2011 | Judd | ............................ | 24/115 R |
| D669,764 S * | 10/2012 | Kelleghan | ...................... | D8/356 |
| 2009/0000086 A1 * | 1/2009 | Bing | ........................... | 24/592.11 |

* cited by examiner

*Primary Examiner* — Amy Sterling
(74) *Attorney, Agent, or Firm* — Ramon L. Pizarro; Edwin H. Crabtree

(57) ABSTRACT

A resilient S-shaped hook for supporting various items from a vertical surface or an overhead support, such as a section of pipe, is disclosed. The S-shaped hook includes a first bend that is joined to a second bend. The second bend ends in a second bend tip that includes a tip-securing tab that extends from the second bend tip. The tip securing tab allows the second bend tip to be used to crease a closed loop from the second bend when the tip securing tab engages a portion of the second bend that is near the first bend.

18 Claims, 4 Drawing Sheets

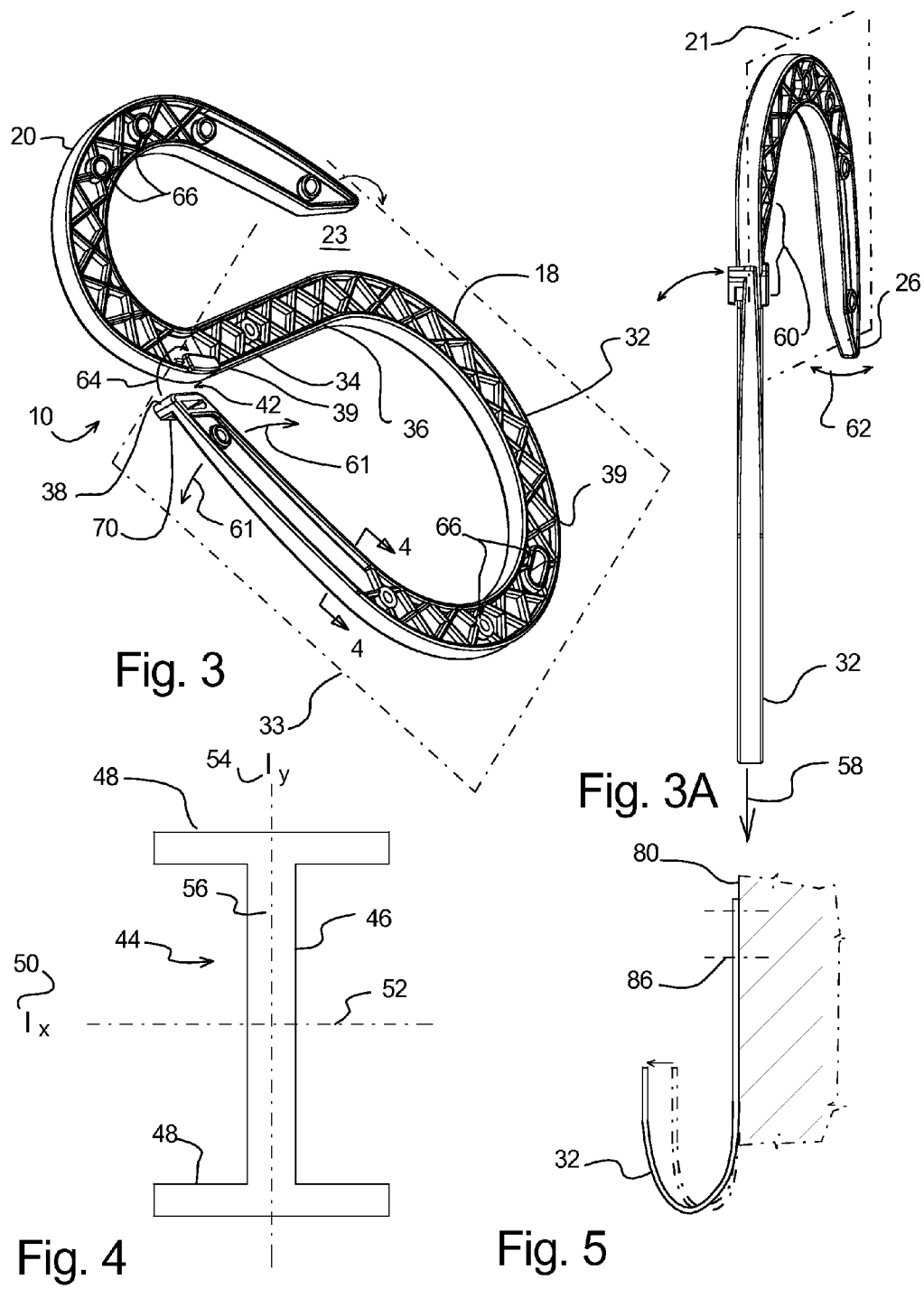

RESILIENT S-HOOK SHAPED CONSTRUCTION SITE TOOL

REFERENCE TO RELATED APPLICATIONS

This application claims the benefit of my U.S. provisional application titled RESILIENT S-HOOK SHAPED CONSTRUCTION SITE TOOL, having Ser. No. 61/712,413, filed Oct. 11, 2012, incorporated herein by reference in its entirety.

BACKGROUND OF THE INVENTION (a) Field of the Invention

This application relates to a device and method for supporting items at a construction site. More particularly, but not by way of limitation, to a resilient S-shaped hook where turns of the hook are out of plane with one another, to allow the use of the turns and resiliency of the hook to accept and retain varying quantities of items, as well as engage various types of support structures.

(b) Discussion of Known Art

S-shaped hooks have been used as links for watch chains, see example U.S. Pat. No. 25,082, to Pollak, or as snap hooks, as was done in U.S. Pat. No. D493,092 to Kalat, or as a component of a carabiner, as shown in U.S. Pat. No. D612,710 to Kelleghan. An important aspect of an S-shaped hook is that it has a pair of bends, each having a throat that can be used to attach the hook to something as well as to hang something from the hook. However, known art has approached the design of hooks as being rigid device. The prevailing theory behind the design of a rigid hook being that if the hook is to be used to support something, then the hook should be rather stiff and strong. Thus steel, aluminum, or other strong metals tend to be the material of choice for the fabrication of these hooks, due to the stiffness, and associated strength provided by these materials.

In the construction trades, there is a need for temporarily supporting materials or components being installed. Clamps, rigid metal hooks are devices used for supporting these items. Alternatively, although highly disfavored or even at times illegal, improvised sections metal strap or wire are also commonly used as temporary supports for items such as wires or conduits during construction. The improvisation is often required due to fact that a large, light, support device is not available for supporting the wires or during construction. Large steel hooks are well known, but these are typically of such large mass and weight that they are simply impracticable for supporting relatively light items such as wires or conduit. Still further, the fact that the hook is made of metal can be quite dangerous when supporting wires, which may carry electricity.

The U.S. Occupation Safety and Health Administration (OSHA) follows 29 C.F.R. 1926.416(e)(2) in requiring that extension cords in a work area shall not be fastened with staples, hung from nails, or suspended by wire. This means that when workers are attempting to keep a work zone free of trip hazards, such as extension chords, must use plastic devices such cable ties to tie each of the chords against the appropriate support structure.

Often, a first extension chord is a used, and then additional extension chord or other types of wiring is added as the project progresses. This is often due to having the first extension chord being in use when additional electrical power is needed in the same area. The use of well-known support devices such as cable ties, which include a one-way ratcheting locking mechanism, makes it difficult to add cables without having to add an excessive number of cable ties.

Therefore, a review of known devices reveals that there remains a need for a device that can be used to temporarily support various items at a construction site, or while performing miscellaneous tasks around the home. Importantly, there remains a need for a device that can be easily transported by an individual engaged in construction or similar work, and which can be safely used to support a variety of items, including items that may carry electricity, such as electrical wiring.

SUMMARY

It has been discovered that the problems left unanswered by known art can be solved by a hook that includes:

A resilient S-shaped body that consists of a first bend and a second bend that are joined by a shank, the first bend creating a first internal gap between a first bend tip and the shank, the second bend creating a second internal gap between the a second bend tip and the shank, and the first bend and the second bend each having an I-beam shaped cross-section that provides a first moment of inertia about an x-axis that is perpendicular to each respective bend, and a moment of inertia about a y-axis that is perpendicular the x-axis, with the moment of inertia about the x-axis being greater than the moment of inertia about the y-axis.

According to a highly preferred example of the invention, the first internal gap is smaller than the diameter of the first bend, and the second internal gap is smaller than the diameter of the second bend. Also, according to this example, the cross-sections of the first and second bend portions are in the form of an I-beam, with the web of the I-beam extending along the y-axis, and the two flanges being parallel to the x-axis along a cross-section taken along a ray extending from the center of the curvature of the first or second bend, at any location along the first or second bend. Additionally, the web portion of the I-beam includes apertures that allow fastening the hook to a support surface. It is important to note that while that in a preferred embodiment of the invention each of the bends incorporates one predominant radius, it is contemplated that multiple radii may be incorporated into each of the bends.

A preferred example of the invention incorporates apertures along the web of the disclosed invention to allow fastening of the hook against a support surface, such as a wooden stud or section of drywall, in a building under construction. As can be understood from the disclosed drawings, according to a preferred example of the invention, the first and second bends are not formed along a single plane. This twist of the two bends along the disclosed invention facilitates the loading of the separate bends with items to be supported from the disclosed S-hook, and facilitates twisting of the tip of one of the bends away from the other bend in order allow the disclosed S-hook to be mounted from items such as pipes or other horizontal members that may be accepted by either of the bends.

Still further, as will be understood from the discussion below that the disclosed invention will preferably be manufactured from a non-conductive polymer material, which will allow the disclosed invention to be used to safely support wiring that carries electrical current wile at the construction site. Thus, the disclosed invention will assist the user in keeping the work area clear of trip hazards such as extension chords or other electrical wiring while complying with work zone safety regulations.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 3 is a perspective view of the disclosed invention, illustrating twisting of the bends to open the internal gap in each bend, to allow insertion of items within each bend.

FIG. 3A is a view looking along the plane of the second bend, and illustrates the angled relationship between the plane of the first bend and the plane of the second bend.

FIG. 4 is a section take along the line labeled 4-4 on FIG. 3, and illustrates the x and y-axes, and typical cross-section used with the disclosed invention.

FIG. 5 is a schematic that illustrates the pulling of the second bend away from the first bend to facilitate loading of the second bend with items such as cables while the first bend is fastened to a vertical surface.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figures 1, 1A, 1B:
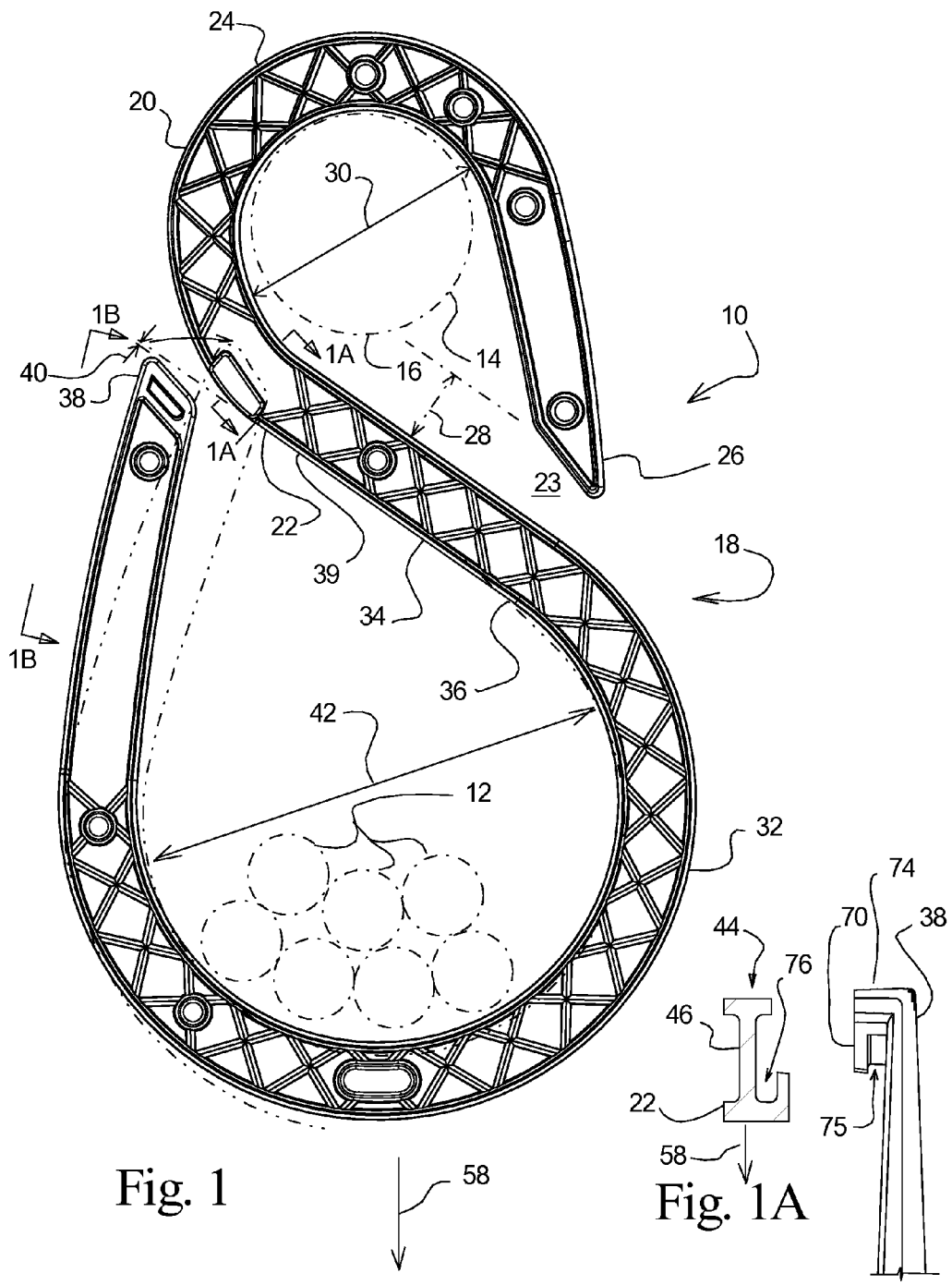
FIG. 1 illustrates the mounting an example of the disclosed invention from a section of round tubing while supporting various items with the disclosed S-hook.
FIG. 1A is a section taken from FIG. 1 in the direction of arrows marked 1A-1A.
FIG. 1B is a view taken from FIG. 1 in the direction of arrows marked 1B-1B.

Turning now to FIG. 1 where an S-shaped hook, or simply "S-hook" 10 that is used for temporarily supporting items such as electrical wiring 12 from a support structure 14, which in FIG. 1 has been shown as being a pipe 16. As will be discussed in further detail below, the support structure 14 may be a section of drywall, a stud, or other surface that permits attachment of a fastener, such as a drywall screw. As can be understood from FIG. 1 the hook 10 includes a generally S-shaped body 18, which is preferably of integral, one-piece construction, of a resilient polymer material. The use of a polymer material with a high dielectric strength is desired in order to allow the disclosed hook to be used in safely supporting wires that carry electrical current.

Referring now to FIGS. 1, 3 and 3A it will be understood that the S-shaped body 18 will include a first bend 20, which in a preferred embodiment is of a single radius and extends along a first plane 21. However, it is also contemplated that the first bend 20 may consist of varying radii that create the bend 20, which extends around, or encircles, more than 180 degrees to define a first throat 23.

As illustrated in FIG. 1, the first bend 20 commences at a first bend termination 22 and extends along a first curved section 24 to a first bend tip 26 or end. The first bend tip 26 is preferably positioned at a distance 28 from the first bend termination 22, to create the first throat 23 between the first bend tip 26 and the first bend termination 22. As can be understood from FIGS. 1-3, the first throat 23 is smaller than the first internal gap 30 of the first bend 20. Accordingly, insertion of large item, such as the pipe 16, into the first internal gap 30 is likely to require that the first bend tip 26 be pulled away from the first bend termination 22 in order to allow the pipe 16 pass through the throat 23 and into the first internal gap 30, as illustrated in FIG. 1.

Figure 2:
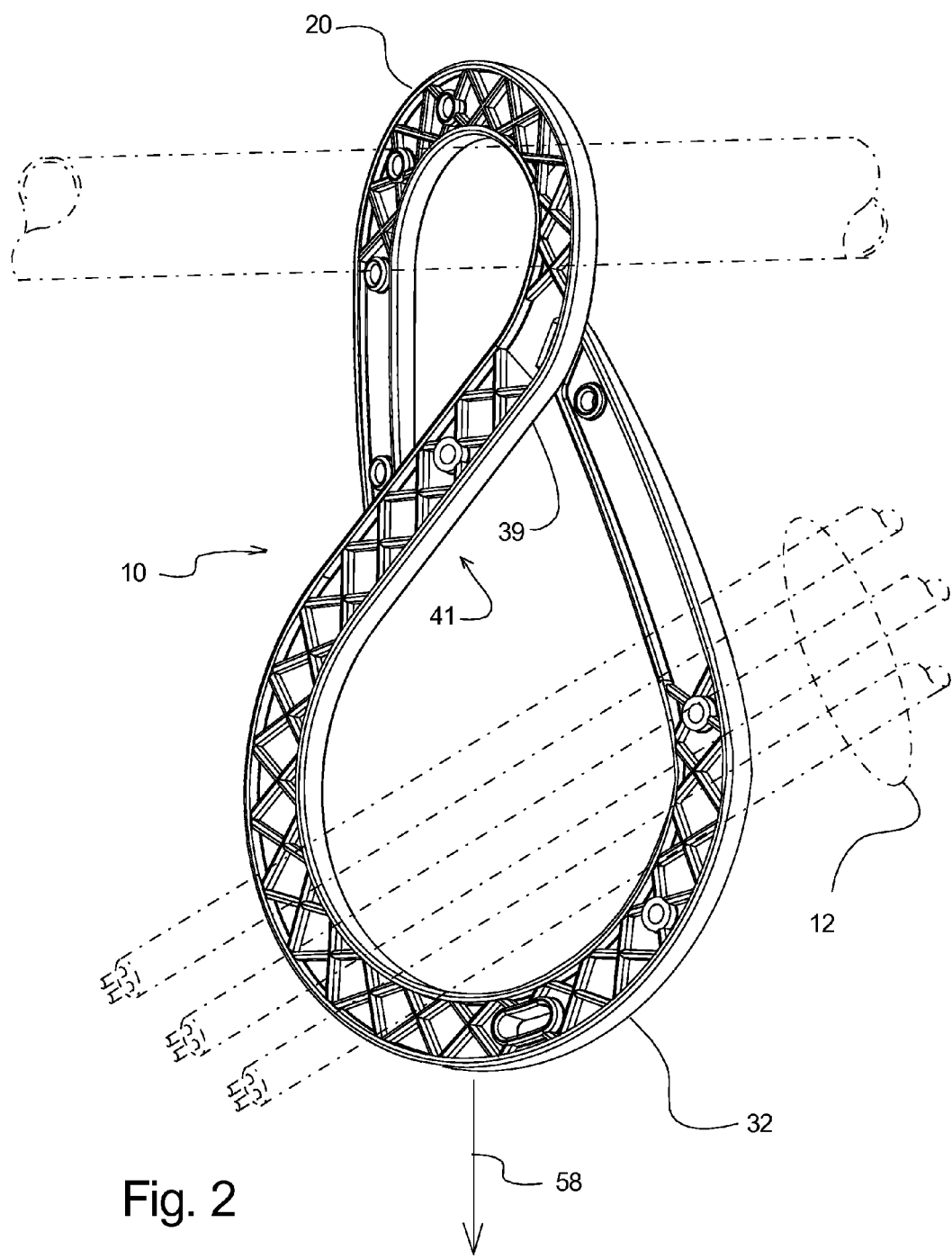
FIG. 2 illustrates the support of multiple items, such as electrical wiring, from the disclosed invention.
Figure 6:
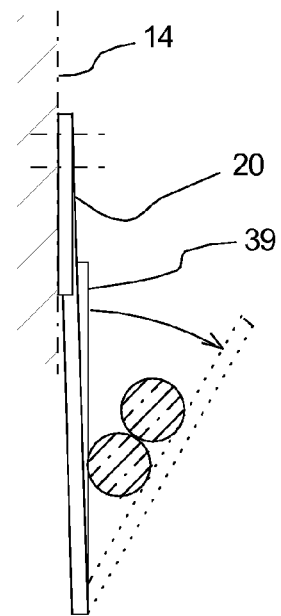
FIG. 6 is also illustrates the disclosed invention while fastened to a flat surface, and also illustrates the twisting of one of the bends in order to temporarily enlarge the internal gap, and thus allow insertion of items to be supported from the disclosed invention in through the enlarged internal gap.

FIGS. 1-3 also show that while it is contemplated that the first bend 20 may be connected directly to a second bend 32, the illustrated preferred embodiment has the first bend 20 joined to the second bend 32 through a shank portion 34, which in a preferred example is simply a generally straight section.

Still further, FIGS. 1-3 also illustrate that the second bend 32 extends along a second plane 33, and commences at a second bend termination 36 that is integral with the shank portion 34 at the second bend termination 36. The second bend 32 then continues to a second bend tip 38, or second tip, creating a second curved section 39. The second bend tip 38 is at a second distance 40 from the second bend termination 36 in order to create a second internal gap 42 between the second bend tip 38 and the second bend termination 36. FIGS. 1-3 also illustrate that in a preferred embodiment of the invention, the second bend 32 is larger than the first bend 20.

Turning now to FIG. 4, it will be understood that according to a highly preferred embodiment of the invention, the hook 10 will have an I-beam shaped cross section 44 as part of both the first bend 20 and the second bend 32. The I-beam shaped cross-section 44 includes a web 43 and flanges 45 that create a first moment of inertia, Mx, 50 about an x-axis 52 that is perpendicular to each respective bend, and a second moment of inertia, My, 54 about a y-axis 56 that is perpendicular the x-axis 52. In the disclosed preferred embodiment of the invention, the first moment of inertia 50 is greater than the second moment of inertia 54. Because the disclosed the bends of the disclosed hook 10 are made of the same material throughout, the disclosed differences in moments of inertia about the two axes results in different bending stiffness about the x-axis 52 and the y-axis 56.

The disclosed invention uses these differences in bending stiffness to create a hook with a very small throat at the end of each, relatively large, bend. The advantages of having a relatively small throat include the ability to secure items within the bends. The relatively small throats can be closed-off easily, and impede the release of items. These advantages are actually enhanced by utilizing the differences in bending stiffness to prevent the opening of the throat 23 when items are retained within each bend. The weight of these items is exerted in a downward direction 58, which would result in bending stresses about the x-axis. Bending about the x-axis would be easily resisted by the relatively large bending stiffness about the x-axis of the cross-section of the respective bends. However, when the user wants to insert large items into the throat area of each respective bend, 20 or 32, the opening of the respective first internal gap 30 or second internal gap 42 that provides access to the throat is easily opened by twisting the bend by pulling the respective tip, 26 or 38, of the respective bend away from the plane of the bend, which will result in the widening of the throat area between the tip and the bend termination as the tip is moved away from the plane of the bend.

By referring now to FIGS. 3 and 3A, it will be understood that the first plane 21 and the second plane 33 are at an angle to one another in a manner that creates a twist 60 along the hook 10 as the second bend 32 transitions into the first bend 20. Also, a comparison of FIGS. 3 and 3A reveals how the first internal gap 30 and the second internal gap 30 are opened through twisting of the second bend 32 in the direction of arrows 61. The size of the first internal gap 30 is increased by moving the first tip 26 in the direction of arrows 62, away from the first plane 21, and the size of the second internal gap 42 is increased by moving the second tip 38 in the direction of arrows 64, away from the second plane 33.

Referring now to FIGS. 1, 1A, 1B, and 2, it will be understood that according to a highly preferred example of the invention, a tip securing tab 70 will be incorporated into the S-hook 10 in order to connect or attach at least one of the tips, such as the second bend tip 38, or an area 39 near the second bend termination 22, such as the shank portion 34 of the S-hook 10. This connection will create a closed loop 41, illustrated in FIG. 2. It has been discovered that this connection allows the curved sections of the S-hook 10 to support a much greater amount of weight, such as the weight from supporting a large bundle of electrical wiring 12 for example, than the curved sections could support if the bend tips or tips, 26 and 38, of the first curved section 24 or the second curved section 39 were simply cantilevered or unattached to any other portion of the S-hook 10 or structure.

FIGS. 1, 1A and 1B, also show that the tip securing tab 70 is preferably supported from a beam 74, which supports the securing tab 70 a distance from the second bend tip 38 and creates a concave portion 75 that facilitates the attachment of the second bend tip 38 to a location on or near the first bend termination 22. FIGS. 1A and 1B also show that the securing tab 70 fits into a pocket 76, or slot-shaped aperture found near the first bend termination 22. The use of the beam 74 to support the securing tab 70 also facilitates the insertion of the securing tab 70 into the pocket 76. Thus, bending the second curved section 32 such that the tab 70 can be inserted into the pocket 76 allows retaining the second bend tip 38 against the S-shaped body 18 at a location near the first bend termination 22. It will be understood that the tab 70 may be made cylindrical in shape, and the pocket 76 may be made of a suitable shape to accept and retain the cylindrical tab. However, the shape of the disclosed preferred embodiment provides a structurally efficient arrangement that is unobtrusive, and thus does not engage or get caught on undesired items.

Turning now to FIGS. 3-6 it will be understood that the I-beam shaped cross-section 44 of the first bend 20 and the second bend 32 each include apertures 66 through the web 46. The apertures 66 have been adapted for accepting a fastener 86, such as a nail or a drywall screw that may be used to support the S-hook 10 from a wall 80 or other vertical support at a construction site.

Figure 7:
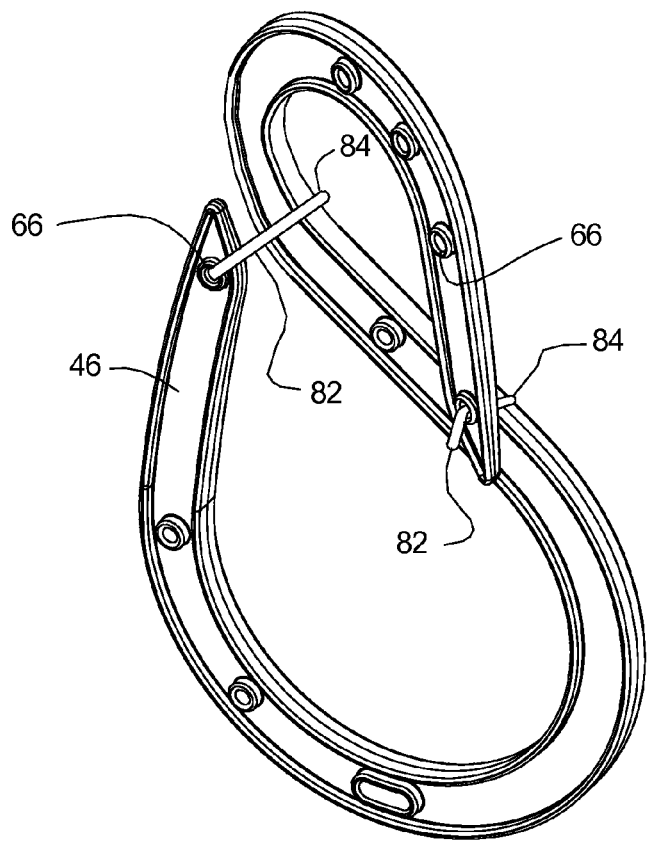
FIG. 7 illustrates the use of auxiliary devices, such as cable ties, to assist in retaining items within the throat of the hook.

Additionally, as illustrated in FIG. 7, the positioning of the apertures 66 have been selected to allow the use of zip-ties 82, wires, string, or any other suitable device between the tip areas, 26 and 38, and the first bend 20 or the second bend 32 in order to provide further support to the tip areas, 26 and 38, and prevent opening of the respective bends.

It will be further understood that a preferred example of the invention will be made of a suitable polymer. Making the disclosed invention of a plastic polymer will provide a great deal of resiliency and toughness to the S-hook 10, and will make the device non-conductive. Making the disclosed invention of a non-conductive material will allow the use the S-hook 10 to support temporary wiring. Still further, the use of a polymer will allow the device to be made of one-piece unitary construction. It is further contemplated that the polymer will also provide a degree of lubricity that will allow pulling the wiring through the curved sections without damaging insulation on the wiring.

Accordingly, the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A resilient S-shaped hook comprising:
a first bend that is joined to a second bend, the second bend extending around a second bend axis, the first bend commencing at a first bend termination and extending along a first curved section to a first bend tip, the first bend tip being at a distance from the first bend termination to create a first internal gap between the first bend tip and the first bend termination;
the second bend commencing at a second bend termination that is connected to the first bend termination, the second bend extending from the second end termination along a second curved section to a second bend tip, the second bend tip being at a distance from the second bend termination to create a second internal gap between the second bend tip and the second bend termination, the first bend and said second bend being twisted relative to one another; and
a tip securing tab that extends from the second bend tip and is adapted for engaging an area near the second bend termination, so that a closed loop is formed when the tip securing tab engages the area near the second bend termination, and so that flexing of the second bend tip away from the second bend termination is limited.

2. A resilient S-shaped hook according to claim 1 wherein the tip securing tab is supported from the second bend tip by a beam that is generally normal to the second curved section.

3. A resilient S-shaped hook according to claim 2 wherein the tip securing tab is generally parallel to the second bend tip and creates a concave portion with the second bend tip.

4. A resilient S-shaped hook according to claim 1 wherein first bend includes a first throat, and the first internal gap is larger than the first throat, and the second bend includes a second throat, and the second internal gap is larger than the second throat.

5. A resilient S-shaped hook according claim 2 wherein said second bend extends along a plane, and said first bend extends away from the plane of the second bend.

6. A resilient S-shaped hook according to claim 5 that is made of a plastic, polymer material, and is of integral, one-piece construction.

7. An S-shaped hook comprising:
a first bend that is joined to a second bend, the first bend commencing at a first bend termination and extending along a first curved section to a first bend tip, the first bend tip being at a distance from the first bend termination to create a first internal gap between the first bend tip and the first bend termination;

the second bend commencing at a second bend termination that is connected to the first end termination, and the second bend extends along a second curved section around a second bend axis to a second bend tip, the second bend tip being at a distance from the second bend termination to create a second internal gap between the second bend tip and the second bend termination, the first bend and said second bend being twisted relative to one another;

the first bend and the second bend each having an I-beam shaped cross-section that provides a first moment of inertia about an x-axis that is perpendicular to each respective bend, and a second moment of inertia about a y-axis that is perpendicular the x-axis, the first moment of inertia being greater than the second moment of inertia; and a tip securing tab, the tip securing tab extending from the bend tip and along a portion of the second bend axis.

8. An S-shaped hook according to claim 7 wherein a portion of the tip securing tab is generally normal to the second curved section.

9. An S-shaped hook according to claim 7 wherein the tip securing tab creates a concave portion with the second bend tip and the concave portion has an opening that opens over the second bend tip.

10. An S-shaped hook according claim 9 wherein said second bend extends along a plane, and said first bend extends away from the plane of the second bend.

11. An S-shaped hook according to claim 9 wherein first bend includes a first throat, and the first internal gap is smaller than the first throat, and the second bend includes a second throat, and the second internal gap is smaller than the second throat.

12. An S-shaped hook according to claim 7 wherein the I-beam shaped cross-section of the first bend and the second bend each include a web portion with apertures through the web, each aperture being adapted for accepting a fastener.

13. An S-shaped hook according claim 11 wherein said second bend extends along a plane, and said first bend extends away from the plane of the second bend.

14. An S-shaped hook according to claim 8 that is made of a plastic, polymer material, and is of integral, one-piece construction.

15. An S-shaped hook comprising:

a first bend that is joined to a second bend, the first bend and said second bend being twisted relative to one another, the first having a first bend termination and extending along a first curved section to a first bend tip through a shank portion that allows twisting of the second bend relative to the first bend, the first bend commencing at a first bend termination and extends along a first curved section to a first bend tip, the first bend tip being at a distance from the first bend termination to create a first internal gap between the first bend tip and the first bend termination, the first bend termination being integral with the shank portion;

the second bend commencing at a second bend termination that is integral with the shank portion, the second bend extending along a second curved section and around a second bend axis to a second bend tip, the second bend tip being at a distance from the second bend termination to create a second internal gap between the second bend tip and the second bend termination; the first bend and the second bend each having an I-beam shaped cross-section that provides a first moment of inertia about an x-axis that is perpendicular to each respective bend, and a second moment of inertia about a y-axis that is perpendicular the x-axis, the first moment of inertia being greater than the second moment of inertia; and a tip securing tab, the tip securing tab extending from the bend tip and along a portion of the second bend axis.

16. An S-shaped hook according to claim 15 wherein a portion of the tip securing tab is generally normal to the second curved section.

17. An S-shaped hook according to claim 16 wherein the tip securing tab creates a concave portion with the second bend tip and the concave portion has an opening that opens over the second bend tip.

18. An S-shaped hook according to claim 17 wherein first bend includes a first throat, and the first internal gap is smaller than the first throat, and the second bend includes a second throat, and the second internal gap being smaller than the second throat.

* * * * *